(12) United States Patent
Kang et al.

(10) Patent No.: US 11,054,542 B2
(45) Date of Patent: Jul. 6, 2021

(54) MULTI-RAY-SOURCE ACCELERATOR AND INSPECTION METHOD

(71) Applicants: Tsinghua University, Beijing (CN); Nuctech Company Limited, Beijing (CN)

(72) Inventors: Kejun Kang, Beijing (CN); Huaibi Chen, Beijing (CN); Yaohong Liu, Beijing (CN); Chuanxiang Tang, Beijing (CN); Yuanjing Li, Beijing (CN); Hao Zha, Beijing (CN); Liang Zhang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 0 days.

(21) Appl. No.: 16/946,953

(22) Filed: Jul. 13, 2020

(65) Prior Publication Data

US 2021/0018649 A1 Jan. 21, 2021

(30) Foreign Application Priority Data

Jul. 16, 2019 (CN) .......................... 201910644153.2

(51) Int. Cl.
*G01V 5/00* (2006.01)

(52) U.S. Cl.
CPC .......... *G01V 5/0041* (2013.01); *G01V 5/0083* (2013.01)

(58) Field of Classification Search
CPC .............................................. H01J 2235/068
See application file for complete search history.

(56) References Cited

U.S. PATENT DOCUMENTS

| 4,047,036 A | * | 9/1977 | Smith | .................. | G01B 15/045 |
| | | | | | 378/56 |
| 5,483,122 A | | 1/1996 | Derbenev et al. | | |

(Continued)

FOREIGN PATENT DOCUMENTS

JP    0922800 A    1/1997

OTHER PUBLICATIONS

"European Application Serial No. 20186259.6, Extended European Search Report dated Nov. 25, 2020", (dated Nov. 25, 2020), 10 pgs.

(Continued)

*Primary Examiner* — Hoon K Song
(74) *Attorney, Agent, or Firm* — Schwegman Lundberg & Woessner, P.A.

(57) ABSTRACT

Embodiments of the disclosure provide a multi-ray-source accelerator and an inspection method. The multi-ray-source accelerator includes: a plurality of acceleration tubes, each acceleration tube of the plurality of acceleration tubes including an acceleration tube body that defines at least one cavity, the plurality of acceleration tubes being arranged in at least one row along a straight line or an arc and connected in series with each other; and a microwave unit configured to provide a microwave field to the plurality of acceleration tubes. The plurality of acceleration tubes are arranged to allow the microwave unit to provide the microwave field from an acceleration tube at one end of the plurality of acceleration tubes so as to accelerate electron beams in cavities of all the acceleration tubes.

20 Claims, 4 Drawing Sheets

(56) References Cited

U.S. PATENT DOCUMENTS

| | | | | |
|---|---|---|---|---|
| 5,490,196 | A | * | 2/1996 | Rudich .............. G01V 5/0041 378/101 |
| 5,811,943 | A | | 9/1998 | Mishin et al. |
| 9,653,251 | B2 | * | 5/2017 | Tang ................... H01J 35/066 |
| 9,734,979 | B2 | * | 8/2017 | Tang ..................... H01J 35/24 |
| 2010/0039051 | A1 | | 2/2010 | Clayton et al. |
| 2015/0063548 | A1 | * | 3/2015 | Kosugi .................. H05G 1/70 378/140 |

OTHER PUBLICATIONS

Sakai, Hiroshi, et al., "Cavity diagnostics using rotating mapping system for 1.3 GHz ERL 9-cell superconducting cavity", IPAC 10, (2010), 2950-2952.

\* cited by examiner

MULTI-RAY-SOURCE ACCELERATOR AND INSPECTION METHOD

CROSS-REFERENCE TO RELATED APPLICATION

This application claims the priority benefit of Chinese Patent Application No. 201910644153.2 filed on Jul. 16, 2019, the whole disclosure of which is incorporated herein by reference.

TECHNICAL FIELD

The present disclosure generally relates to the field of X-ray inspection, and in particular to a multi-ray-source accelerator and an inspection method.

BACKGROUND

Ray sources refer to devices capable of generating rays. Generally, X-ray tubes and electron linacs are used as ray sources. Due to their different working principles, they are generally applied according to the following energy range: X-ray tubes are mainly used to generate X-rays with an energy of less than 500 keV (the energy here refers to the energy of electron beams before shooting), X-ray tubes that generate X-rays with an energy of higher than 500 keV are more expensive to produce, and electron linacs are mainly used to generate X-rays with an energy of higher than 2 MeV.

In the current large-scale vehicle/container security inspection equipment of customs, civil aviation and railway transportation, electron linear accelerator systems are mostly used as X-ray generating devices. High-energy X-rays generated by the devices can perform non-destructive testing on objects of different thicknesses and masses, effectively identify the items to be inspected quickly without unpacking, and identify and mark the prohibited items contained in the items to be inspected.

The use of multiple ray sources can improve the ability of substance identification in ray inspections. However, the current multi-ray-source systems are expensive to be produced, need a large installation space, have high requirements for application sites, and also have poor adaptability and high cost. An improved multi-ray-source device or system is needed to meet the requirements of ray inspections.

SUMMARY

Embodiments of the present disclosure provide a multi-ray-source accelerator, comprising:

a plurality of acceleration tubes, each acceleration tube of the plurality of acceleration tubes comprising an acceleration tube body that defines at least one cavity and comprises a first end and a second end opposite to the first end in a first direction, the plurality of acceleration tubes being arranged in at least one row along a straight line or an arc in a second direction different from the first direction and being connected in series with each other such that cavities of two adjacent acceleration tubes connected in series are in fluid communication with each other; and a microwave unit configured to provide a microwave field to the plurality of acceleration tubes, so as to accelerate electron beams in the at least one cavity of each acceleration tube of the plurality of acceleration tubes;

wherein the plurality of acceleration tubes are arranged to allow the microwave unit to provide the microwave field from an acceleration tube at one end of the at least one row of plurality of acceleration tubes connected in series with each other, so as to accelerate the electron beams in the at least one cavity of each acceleration tube of the at least one row of plurality of acceleration tubes.

In an embodiment, the plurality of acceleration tubes are arranged in a row in the second direction, each acceleration tube body defines a plurality of cavities connected in series in the first direction, and the plurality of acceleration tubes are arranged to allow the microwave unit to provide the microwave field from a cavity of an acceleration tube at one end of the row of plurality of acceleration tubes, so as to establish an acceleration field in cavities of the at least one row of plurality of acceleration tubes to accelerate the electron beams emitted from the first end toward the second end in the first direction within the cavities of each acceleration tube; or the plurality of acceleration tubes are arranged in a plurality of rows in the second direction, each acceleration tube body defines a plurality of cavities connected in series in the first direction, and the plurality of acceleration tubes are arranged to allow the microwave unit to provide the microwave field from a cavity of an acceleration tube at one end of the plurality of rows of acceleration tubes, so as to establish an acceleration field in the cavities of the at least one row of plurality of acceleration tubes to accelerate the electron beams emitted from the first end toward the second end in the first direction within the cavities of each acceleration tube.

In an embodiment, the multi-ray-source accelerator further comprises a plurality of electron beam emission devices. Each of the plurality of acceleration tubes is connected to a corresponding electron beam emission device among the plurality of electron beam emission devices. The corresponding electron beam emission device is disposed at the first end of each accelerator tube and configured to emit electron beams from the first end of the acceleration tube toward the opposite second end in the first direction.

In an embodiment, each of the plurality of acceleration tubes comprises a target installed at the second end of a corresponding acceleration tube, such that the electron beams emitted from the first end of the acceleration tube toward the opposite second end in the first direction within the cavity bombards on the target to generate rays.

In an embodiment, each of the plurality of acceleration tubes comprises a collimator configured to collimate rays generated by the acceleration tube into a ray beam. The collimator is connected to a corresponding acceleration tube among the plurality of acceleration tubes. Each of the plurality of collimators is configured to have a collimation slit capable of independently adjusting its orientation so as to adjust, independently of the other acceleration tubes, the rays generated by the acceleration tube connected to the each collimator, thereby generating a desired ray beam.

In an embodiment, the collimator is configured to be rotatable relative to the acceleration tube body so that the rays emitted by respective acceleration tube have the same orientation and profile.

In an embodiment, each collimator is rotatable relative to the acceleration tube body so that the collimation slit of the collimator extends in a vertical direction, an inclined direction, or a horizontal direction.

In an embodiment, the multi-ray-source accelerator further comprises a shield configured to surround the plurality of acceleration tubes, so as to shield the electron beams generated by the plurality of acceleration tubes and the rays generated by the plurality of acceleration tubes.

In an embodiment, the shield has an integral structure such that the plurality of acceleration tubes are surrounded by the integral shield.

In an embodiment, the multi-ray-source accelerator further comprises a cooling water loop. The cooling water loop is in communication with the microwave unit to cool the microwave unit. The cooling water loop is in communication with the acceleration tube bodies of the plurality of acceleration tubes to cool the acceleration tube bodies, the targets, the collimators and the shield. The cooling water loop is further in communication with the electron beam emission devices to cool the electron beam emission devices.

In an embodiment, the multi-ray-source accelerator further comprises a gas supply pipeline configured to provide carrier gas to the microwave unit.

Embodiments of the present disclosure provide an inspection method using the multi-ray source accelerator described in any of embodiments of the present disclosure, comprising:

activating the microwave unit to provide the microwave field from an acceleration tube at one end of the row of plurality of acceleration tubes connected in series with each other;

providing gas to a waveguide structure of the microwave unit with the gas supply pipeline;

emitting electron beams in the first direction with the electron beam emission device, so that the electron beams are accelerated by the microwave field to bombard on the target; and irradiating an article with one or more ray beams emitted by the multi-ray source accelerator;

wherein the cooling water loop provides cooling water to cool the acceleration tube bodies, the targets, the collimators, the electron beam emission devices and the shield.

BRIEF DESCRIPTION OF THE ACCOMPANYING DRAWINGS

DETAILED DESCRIPTION

Embodiments of the present disclosure provide a multi-ray-source accelerator, comprising: a plurality of acceleration tubes, each acceleration tube of the plurality of acceleration tubes comprising an acceleration tube body that defines at least one cavity and comprises a first end and a second end opposite to the first end in a first direction, the plurality of acceleration tubes being arranged in a row along a straight line or an arc in a second direction different from the first direction and being connected in series with each other such that cavities of two adjacent acceleration tubes connected in series are in fluid communication with each other; and a microwave unit configured to provide a microwave field to the plurality of acceleration tubes so as to accelerate electron beams in the at least one cavity of each acceleration tube of the plurality of acceleration tubes; wherein the plurality of acceleration tubes are arranged to allow the microwave unit to provide the microwave field from an acceleration tube at one end of the row of plurality of acceleration tubes connected in series with each other, so as to accelerate electron beams in the at least one cavity of each acceleration tube of the row of plurality of acceleration tubes.

The acceleration tubes are arranged in the second direction and connected in series so as to be suitable for the microwave field to be transmitted into the cavity of each acceleration tube in the second direction.

Figure 1:
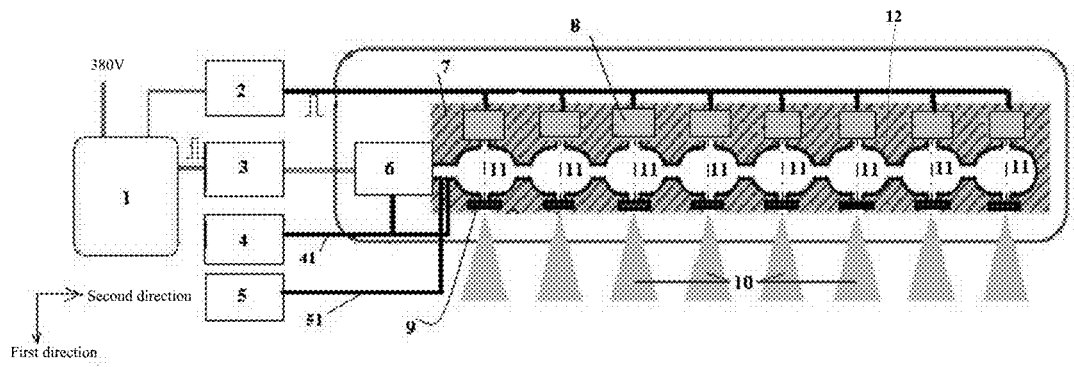
FIG. 1 is a schematic structure diagram of a multi-ray-source accelerator according to an embodiment of the present disclosure.

In an embodiment, as shown in FIG. 1, the multi-ray-source accelerator comprises a plurality of acceleration tubes, each of which comprises an acceleration tube body 12 that defines a cavity 11. According to this embodiment, each acceleration tube body in the figure is arranged or extends in an up-down direction or a vertical direction (i.e., the first direction described above), while the plurality of acceleration tubes are arranged in a left-right direction or a horizontal direction (i.e., the second direction described above). It should be understood that, in other embodiments of the present disclosure, the plurality of acceleration tubes may be arranged in an inclined direction, which is at an angle to, for example, the up-down direction. The plurality of acceleration tubes are arranged side by side in the left-right direction one after another. As shown, the right side of the first acceleration tube on the left of the figure is connected to the left side of the second acceleration tube on the left of the figure, so that the first acceleration tube on the left is in fluid communication with the second acceleration tube on the left. Likewise, the plurality of acceleration tubes are connected in series one by one, that is, the plurality of cavities 11 of the plurality of acceleration tubes are kept in fluid communication with one another. The channel for connecting the plurality of acceleration tubes may be a pipe connected to the acceleration tube bodies, and two adjacent acceleration tube bodies are kept in fluid communication with each other through the channel. In another embodiment, the plurality of acceleration tubes are formed to have a communicating portion between their acceleration tube bodies, so that two adjacent acceleration tube bodies are kept in fluid communication with each other.

Each acceleration tube body defines a cavity 11 or space within which particle beams, such as electron beams, can propagate or run without being unimpeded. In an embodiment, a plurality of cavities 11 of the plurality of acceleration tubes are kept in fluid communication with one another.

In an embodiment, vacuum is maintained in the cavities 11 of the plurality of acceleration tubes, and the degree of vacuum can be set as needed.

In an embodiment, the multi-ray-source accelerator comprises a microwave unit 6 connected to the leftmost accelerator tube in FIG. 1, and the microwave unit 6 provides a microwave field to the leftmost accelerator tube in FIG. 1. Since the cavities of the plurality of acceleration tubes are kept in fluid communication with one another, the microwave field provided by the microwave unit 6 can propagate and distribute within the cavities 11 of the plurality of acceleration tubes (in the second direction). Specifically, the microwave unit 6 can provide the microwave field from the leftmost acceleration tube in FIG. 1 to the plurality of acceleration tubes, so that an acceleration field is established in all of the cavities 11 of the eight acceleration tubes as shown in FIG. 1. In this embodiment, the acceleration field can be established in the (eight) cavities 11 of eight acceleration tubes by one microwave unit 6, thus making the entire structure of the multi-ray-source accelerator more compact. In this embodiment, there are eight acceleration tubes, and in other embodiments, other numbers of acceleration tubes may be provided. In this embodiment, as shown, the eight acceleration tubes are connected in series one by one along a straight line in the horizontal direction. However, in other embodiments of the present disclosure, the plurality of acceleration tubes are arranged along a straight line in a non-horizontal direction. The arrangement of the plurality of acceleration tubes may be set according to actual needs.

In an embodiment of the present disclosure, the multi-ray source accelerator further comprises a plurality of electron beam emission devices 8. As shown in FIG. 1, each of the plurality of acceleration tubes is connected to a corresponding one of the plurality of electron beam emission devices 8. In short, one acceleration tube is equipped with one electron beam emission device 8. In FIG. 1, the electron beam emission device 8 is provided at the upper end (first end) of the corresponding acceleration tube and configured to emit electron beams from the upper end (first end) of the acceleration tube toward the lower end (opposite second end) in the first direction. In this embodiment, the electron beams emitted by the electron beam emission device 8 may be fed into the cavity 11 of the acceleration tube through a vacuum beam current pipe (not shown in detail in FIG. 1). The electron beam emission devices 8 may be an array of electron guns, for example, diode guns or grid-controlled guns may be used. The technology of diode guns is relatively mature and stable, and the grid-controlled guns can meet the needs of rays (such as X-rays) with different energies and doses because of its adjustable emission current size and pulse width.

In an embodiment of the present disclosure, each of the plurality of acceleration tubes in the multi-ray-source accelerator comprises a target 9. As shown in FIG. 1, the target 9 is installed at the lower end (second end) of the acceleration tube such that the electron beams emitted from the first end of the acceleration tube toward the opposite second end in the first direction within the cavity 11 bombards on the target 9 to generate rays. In other words, the rays exit from the second end of the acceleration tube. For example, the target 9 may be installed at the geometric center of the second end of the acceleration tube, then the targets 9 of the plurality of acceleration tubes are spaced apart from each other by a certain distance, that is, the plurality of targets 9 are arranged at the same interval. The target 9 may be a pure tungsten target or pure copper target or composite target material, and different target materials may be selected according to different dosage and energy requirements. According to an embodiment of the present disclosure, the target 9 may further comprise a target heat dissipation structure for heat dissipation of the target 9.

In embodiments of the present disclosure, the electron beam energy of the electron beam emission device 8 and the material of the target 9 can be set according to the needs of the emitted rays, thus obtaining rays of different wavelength bands, such as X-rays and terahertz rays.

In the embodiments of the present disclosure, since each acceleration tube is equipped with an electron beam emission device 8, the emission of each electron beam emission device 8 can be controlled by a switch, so that each acceleration tube can be controlled individually to emit rays.

In the embodiments of the present disclosure, each of the plurality of acceleration tubes comprises a collimator 91 configured to collimate the rays generated by the acceleration tube into a ray beam 10. The collimator 91 is connected with a corresponding one of the plurality of acceleration tubes. Each of the plurality of collimators 91 is configured to have a collimation slit capable of independently adjusting its orientation so as to adjust, independently of the other acceleration tubes, the rays emitted by the acceleration tube connected to the each collimator 91, thereby generating a desired ray beam 10.

In the embodiments of the present disclosure, the collimator 91 is rotatable relative to the target 9, or relative to the corresponding acceleration tube. Specifically, the collimator 91 can rotate with the target 9 as a center, such that the collimation slit of the collimator 91 rotates relative to the acceleration tube body, or relative to the target 9, thereby obtaining a ray beam 10 exiting along different planes, such as a fan-shaped ray beam 10 exiting along different planes. For example, in an embodiment, the collimation slit may be regarded as rotating with the target 9 as an axis, so as to adjust the angle of the collimation slit relative to the vertical direction or relative to the horizontal direction, thereby obtaining different ray shapes. Since the plurality of accelerator tubes emit ray beams 10 at the same time, a row or array of ray beams 10 can be obtained.

Figure 6:
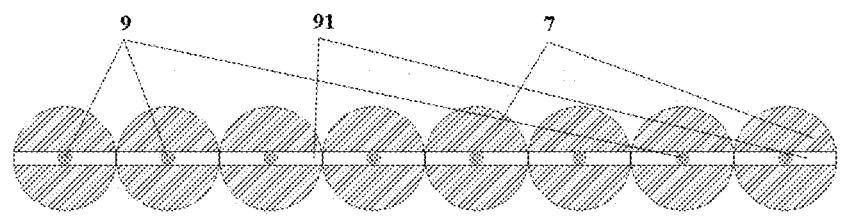
FIG. 6 is a schematic arrangement diagram of collimators according to an embodiment of the present disclosure.
Figure 7:
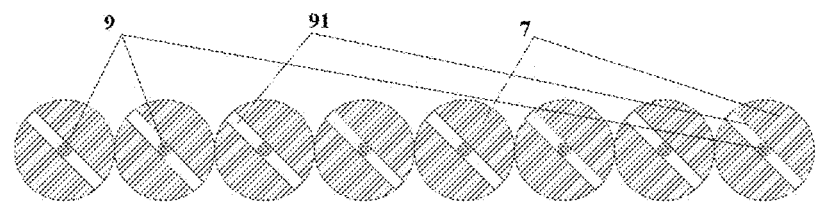
FIG. 7 is a schematic arrangement diagram of collimators according to an embodiment of the present disclosure.
Figure 8:
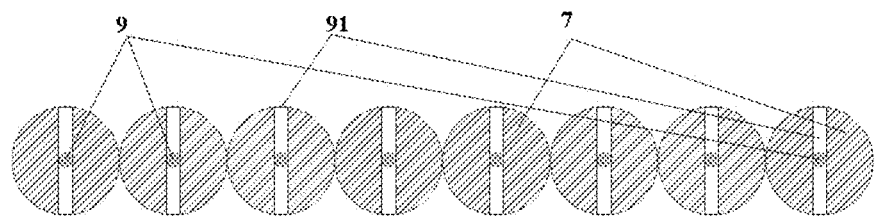
FIG. 8 is a schematic arrangement diagram of collimators according to an embodiment of the present disclosure.

For example, in an embodiment, since the collimators 91 are rotatable, the collimators 91 of the plurality of acceleration tubes are configured so that the rays emitted by each acceleration tube have the same orientation and profile. In an embodiment, as shown in FIG. 6, the collimation slits of the collimators 91 of the plurality of acceleration tubes are arranged to extend in the horizontal direction. With this arrangement, the ray beams 10 emitted by the plurality of acceleration tubes are distributed on the same plane. In an embodiment, as shown in FIG. 7, the collimation slits of the collimators 91 of the plurality of acceleration tubes are arranged to extend in an inclined direction relative to the vertical direction. With this arrangement, the ray beams 10 emitted by the plurality of acceleration tubes can simultaneously intercept eight cross-sections on one article, improving inspection speed or detection accuracy. In an embodiment, as shown in FIG. 8, the collimation slits of the collimators 91 of the plurality of acceleration tubes are arranged to extend in the vertical direction. With this arrangement, the targets 9 of the plurality of acceleration tubes are spaced apart by the same distance, and the collimator 91 is arranged with the target 9 as the axis, then the emitted plurality of ray beams 10 are also separated from each other by the same distance, and each ray beam 10 irradiates with the same profile, so that multiple pieces of image information can be acquired under the same condition, for example, eight cross-sections can be intercepted simultaneously on an article, improving efficiency and accuracy.

In an embodiment, the multi-ray-source accelerator further comprises a shield 7 configured to surround the plurality of acceleration tubes so as to shield the electron beams generated by the plurality of acceleration tubes and the rays generated by the plurality of acceleration tubes. In an embodiment, the shield 7 has an integral structure such that the plurality of acceleration tubes are wrapped or surrounded by the integral shield 7. The material of the shield 7 may be tungsten or lead. The shield 7 may be integrated or one-piece, so that only one shield 7 is needed to surround or wrap all the acceleration tubes as well as their electron beam emission devices 8 and targets 9 to shield the electron beams and rays. That is to say, the safety and compact structure can be realized at the same time, and the cost can be reduced.

In an embodiment, the multi-ray-source accelerator may further comprise a cooling water loop. The cooling water loop is in communication with the microwave unit 6 so as to cool the microwave unit 6. The cooling water loop is in communication with the acceleration tube bodies of the plurality of acceleration tubes so as to cool the acceleration tube bodies, the targets 9, the collimators 91 and the shield 7. The cooling water loop is further in communication with the electron beam emission devices 8 so as to cool the electron beam emission devices 8. The cooling water loop comprises a cooling water pipe which may be arranged to surround the targets 9, the collimators 91, the acceleration tube bodies, and so on. Cooling water flows in the cooling water pipe and takes away heat to achieve cooling. The cooling water pipe may be distributed inside the shield 7 by passing through the shield 7, or may surround the outside of the shield 7, so as to cool the shield 7.

The cooling water pipe may surround components in the microwave unit 6. For example, the microwave unit 6 comprises a pulse power source and one or more waveguide devices. The pulse power source may comprise a high-power microwave device such as a magnetron or a klystron. The microwave power output from the pulse power source is fed into the array-type acceleration tube body through a waveguide port of the waveguide structure, and establishes an acceleration field after a very short time (100 ns). Then electron beams are emitted by controlling the electron gun array and fed into the acceleration tube through the vacuum beam current pipe. Under the action of the acceleration field, the electron beams are accelerated to shoot the target 9 so as to generate array X-rays. The cooling water pipe may be passed into the pulse power source to cool the pulse power source.

In an embodiment, the multi-ray source accelerator may further comprise a gas pipeline 51 configured to provide gas to the microwave unit 6, for example, to provide gas to the waveguide structure so as to prevent high-voltage ignition in the waveguide. The gas provided in the gas pipeline 51 may be $SF_6$.

Figure 2:
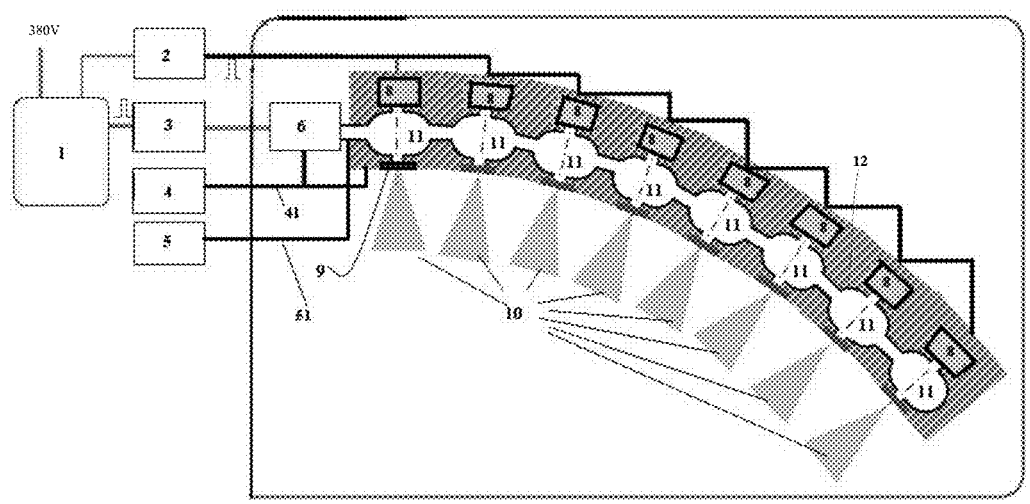
FIG. 2 is a schematic structure diagram of a multi-ray-source accelerator according to an embodiment of the present disclosure.

FIG. 2 shows another embodiment. The embodiment shown in FIG. 2 is similar to the embodiment shown in FIG. 1, except that a plurality of (e.g., eight) acceleration tubes are arranged along an arc. In this embodiment, the microwave unit 6 is connected to the leftmost accelerator tube among the eight acceleration tubes arranged along the arc. Since the cavities 11 of the eight acceleration tubes are in fluid communication with one another, the microwave field provided by the microwave unit 6 establishes an acceleration field in the eight cavities 11 arranged along the arc. When the electron beams pass through the cavities 11 in the up-down direction, the acceleration field in each cavity 11 accelerates the electron beams in each cavity 11, so that the electron beams are accelerated from the first end (upper end of the figure) toward the lower end (second end) of the acceleration tube. In this embodiment, the eight acceleration tubes are arranged along the arc, so that the acceleration tubes may be arranged around an article or a human body. When the acceleration tube emits rays, it is possible to emit rays in multiple directions to achieve multi-view imaging. In an embodiment, the number of acceleration tubes may be more, such as 10, 15, etc., thus increasing the emission of rays from different angles and providing more imaging information.

In the embodiment shown in FIG. 2, the arrangement of the plurality of acceleration tubes, the electron beam emission devices 8 and the targets 9 of the acceleration tubes is similar to the embodiment shown in FIG. 1, except that if each acceleration tube as well as the electron beam emission device 8 connected to the first end of each acceleration tube and the target 9 installed at the second end of each acceleration tube are regarded as an acceleration tube unit, the eight acceleration tube units in FIG. 2 are arranged along the arc.

Figure 3:
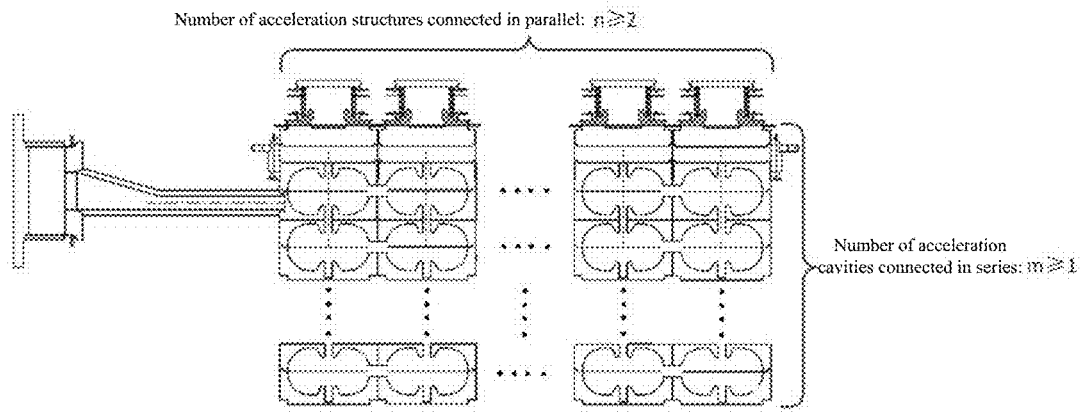
FIG. 3 is a schematic structure diagram of a multi-ray-source accelerator according to an embodiment of the present disclosure.

FIG. 3 shows another embodiment. The embodiment shown in FIG. 3 is similar to the embodiment shown in FIG. 1, except that a plurality of (e.g., eight) acceleration tubes have a different structure and arrangement. In the embodiment shown in FIG. 3, each acceleration tube may define a plurality of cavities 11, and the plurality of acceleration tubes are arranged one after another. According to the present disclosure, the structure in which the cavities 11 of the acceleration tube are connected in series may be referred to as a cavity chain of the acceleration tube. In the cavity chain, the number of cavities is not less than two. In the arrangement shown in FIG. 3, the cavity chain includes more than twelve cavities 11.

Figure 4:
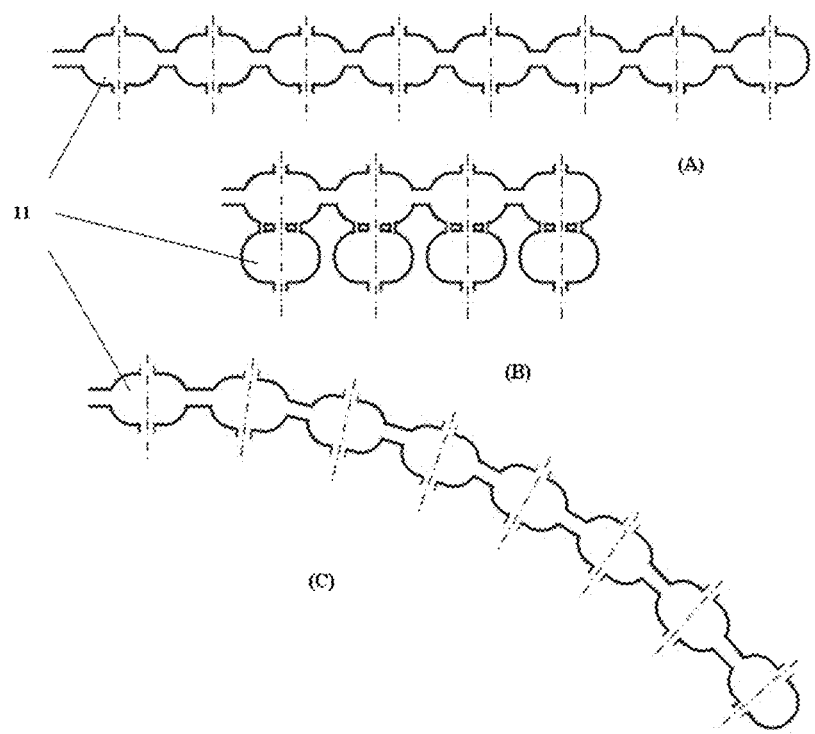
FIG. 4 shows in parts (A), (B) and (C) schematic diagrams of a cavity chain of acceleration tubes of a multi-ray-source accelerator according to an embodiment of the present disclosure.

FIG. 4 shows various cavity chains formed by the cavities 11. FIG. 4 shows in part (A) a single-row cavity chain; FIG. 4 shows in part (B) a cavity chain of a double-row structure, that is, each acceleration tube has two cavities 11, and four acceleration tubes are connected in series; and FIG. 4 shows in part (C) a single-row cavity chain, and the cavity chain is arranged along an arc.

It should be understood that the structures of various cavity chains in FIG. 4 may be combined with each other. For example, the cavity chain of the double-row structure in part (B) of FIG. 4 may be arranged along the arc. The number of cavities 11 in FIG. 4 is only an example, and in other embodiments of the present disclosure, other numbers of cavities 11 may be provided.

As shown in part (A) of FIG. 4, a plurality of acceleration tubes arranged in a row may be in fluid communication with one another through a pipe, or each acceleration tube comprises a communicating portion through which adjacent acceleration tubes realize fluid communication therebetween. The microwave field can be transmitted in the horizontal direction (second direction) as shown in the acceleration tube.

As shown in part (B) of FIG. 4, the acceleration tube body of each of the plurality of acceleration tubes arranged in a row defines two cavities 11. The two cavities 11 are arranged in the up-down direction (first direction), and each cavity 11 is generally symmetrical about an axis. The ray beam 10 is emitted from the upper to the lower, and the two cavities 11 are in fluid communication with each other to allow the electron beams to propagate along the axes of the cavities 11 shown in the figure so as to be accelerated by the microwave field.

In the embodiments shown in FIG. 4, a plurality of cavities are arranged and connected in series to form a cavity chain, and two cavities communicate with each other by a pipe. Each cavity thus has four openings, where the openings at the upper and lower ends are used for transmission of the electron beams, and the two openings at the left and right ends are used for transmission of the microwave field. The cavity chain can be formed by any suitable method such as forging, casting, or the like.

The embodiment shown in FIG. 3 comprises a plurality of acceleration tubes arranged in at least one column (which may include a plurality of columns) in the left-right direction (second direction) and connected in series to form a cavity chain. Each acceleration tube has a plurality of cavities 11 arranged in the up-down direction (first direction), and the plurality of cavities 11 of the acceleration tube are in fluid communication with one another. The electron beams are accelerated within the plurality of cavities 11 of one acceleration tube from the first end of the acceleration tube toward the second end in the first direction, and finally bombard on the target 9 disposed at the second end of the acceleration tube, thereby generating rays.

It is advantageous that the acceleration tube in FIG. 3 comprises a plurality of cavities 11. In the case of applying the same microwave field, if the electron beams are accelerated within the plurality of cavities 11, the resulting speed is higher than that obtained by accelerating in one cavity 11, and the electron beams have greater energy. Therefore, the acceleration tube comprising a plurality of cavities 11 can realize the acceleration of the electron beams more effectively. It is advantageous to connect a plurality of acceleration tubes in series, because the operation of the plurality of acceleration tubes can be realized by only one microwave unit 6, making the overall device more compact.

Figure 9:
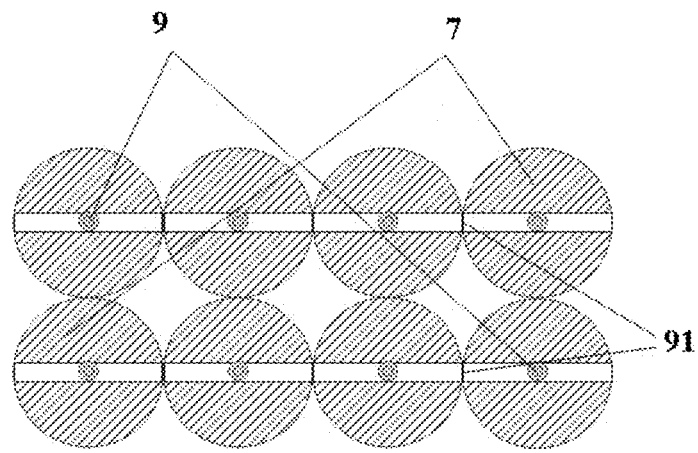
FIG. 9 is a schematic arrangement diagram of collimators according to an embodiment of the present disclosure.

FIG. 9 shows an arrangement of collimators 91 of the embodiment of the multi-ray-source accelerator in FIG. 3. In the embodiment shown in FIG. 9, the multi-ray-source accelerator has two rows of acceleration tubes, with four acceleration tubes arranged in a row. Each acceleration tube has a plurality of cavities 11. Collimation slits of the collimators 91 of the two rows of acceleration tubes are oriented or extend horizontally so that the multi-ray-source accelerator emits two ray beams 10. Since the ray beams 10 provided by the four acceleration tubes are superimposed into one ray beam 10, the energy of the ray beam 10 is enhanced.

Figure 10:
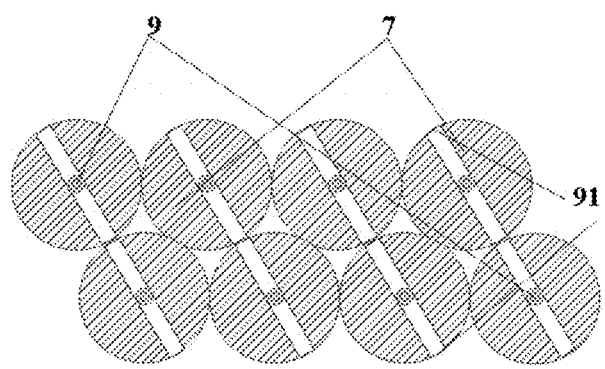
FIG. 10 is a schematic arrangement diagram of collimators according to an embodiment of the present disclosure.

FIG. 10 shows an arrangement of collimators 91 of the embodiment of the multi-ray-source accelerator in FIG. 3. In the embodiment shown in FIG. 10, the multi-ray-source accelerator has two rows of acceleration tubes, with four acceleration tubes arranged in a row. Each acceleration tube has a plurality of cavities 11 (which may include one cavity 11, two cavities 11 or more cavities 11). Collimation slits of the collimators 91 of the two rows of acceleration tubes are oriented or extend obliquely (relative to the horizontal direction) so that the multi-ray-source accelerator emits four beams, each of which is distributed on an inclined plane. Since each ray beam is formed by superimposing the ray beams provided by two acceleration tubes, the energy of each ray beam is enhanced, thereby providing four energy-enhanced ray beams emitted along the inclined plane at the same time, which greatly improves the accuracy and efficiency of inspection.

The multi-ray-source accelerator in FIG. 3 may have other arrangements. The orientation of the collimators 91 may be adjusted as needed, so that the orientation setting of the ray beams can be achieved.

In the above embodiments, multiple energy-enhanced ray beams can be obtained with one multi-ray-source accelerator, and orientation of the ray beams can be adjusted flexibly, which greatly improves the application adaptability of the multi-ray source accelerator and improves the accuracy and efficiency of inspection.

Figure 5:
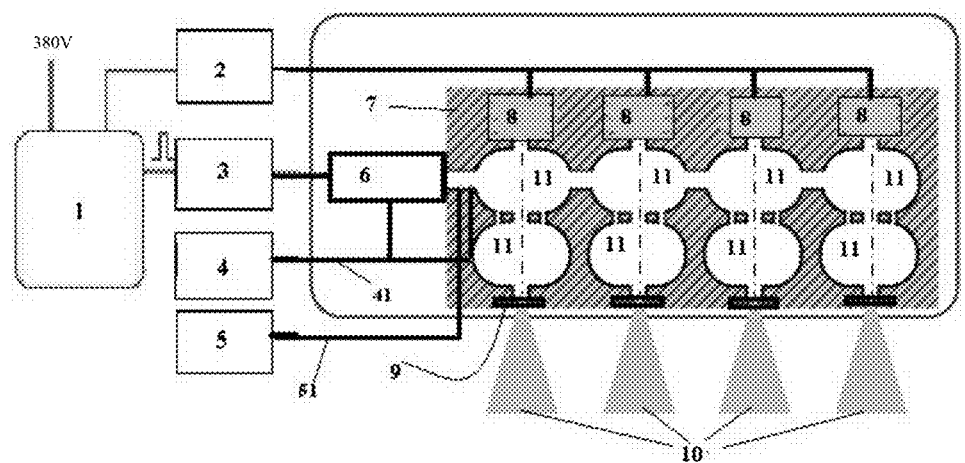
FIG. 5 is a schematic structure diagram of a multi-ray-source accelerator according to an embodiment of the present disclosure.

FIG. 5 shows a schematic structure diagram of a multi-ray-source accelerator according to an embodiment of the present disclosure. The embodiment shown in FIG. 5 is similar to that of FIG. 1, except that each acceleration tube comprises two cavities 11. In this embodiment, four acceleration tubes are arranged one after another in the second direction and connected in series. Each acceleration tube comprises two cavities 11 arranged in the first direction and in fluid communication with each other. In this embodiment, electron beams will be emitted from the electron beam emission device 8 located at the first end of the acceleration tube. The electron beams are emitted from the first end of the acceleration tube toward the second end in the first direction, and accelerated by the microwave field provided by the microwave unit 6 within the two cavities 11 connected in series. Therefore, under the conditions of the same electron beam emission energy and the same microwave field, the energy of the electron beams reaching the target 9 increases. The arrangement of the collimators 91 of the multi-ray source accelerator shown in FIG. 5 can refer to the configuration of the collimation slits shown in FIG. 9, except that there is only one row of acceleration tubes. When the collimation slits of the collimators 91 extend in the same direction, for example, in the horizontal direction, the multi-ray-source accelerator emits only one ray beam 10, and the energy of the ray beam 10 is enhanced. When the collimation slits of the collimators 91 extend in the inclined direction, the multi-ray-source accelerator emits four ray beams 10 along the inclined plane.

According to the present disclosure, the multi-ray-source accelerator may comprise other components, for example, as shown in FIG. 1, a pulse modulator 1, a gun high-voltage power supply assembly 2, a magnetic pulse transformer 3, a water-cooled unit 4, an inflation device 5, and the like.

In operation, the pulse modulator 1 is supplied with 380V AC power, thus generating and outputting 220V AC and 24V DC voltages to the gun high-voltage power supply assembly 2; the pulse modulator 1 also generates and outputs a DC pulse high voltage which is provided to the magnetron pulse transformer 3. The gun high-voltage power supply assembly 2 may be placed in the pulse modulator 1 or near the electron gun. For example, a ray machine head is provided, and the gun high-voltage power supply assembly 2 is provided inside the ray machine head. The setting or arrangement of the gun high-voltage power supply assembly 2 and the pulse modulator 1 can be adjusted according to the conditions on site, so as to achieve the purpose of safe operation.

The water-cooled unit 4 provides two channels of water cooling. One is provided to the magnetron of the microwave unit 6, and the other is provided to the acceleration tube bodies, the shield 7, the targets 9 and the like.

The inflation device 5 may supply gas, such as $SF_6$, into the gas pipeline 51.

The multi-ray-source accelerator may also comprise an application specific integrated circuit (ASIC), a field programmable gate array (FPGA), a digital signal processor (DSP), or other integrated devices, so as to achieve desired function settings.

Another aspect of the present disclosure provides an inspection method using the multi-ray-source accelerator described above, comprising:

activating the microwave unit 6 to provide the microwave field from an acceleration tube at one end of the row of plurality of acceleration tubes connected in series with each other;

providing gas to a waveguide structure of the microwave unit 6 with the gas pipeline 51;

emitting electron beams in the first direction by the electron beam emission device 8, so that the electron beams are accelerated by the microwave field to bombard onto the target;

wherein the cooling water loop provides cooling water to cool the acceleration tube bodies, the targets 9, the collimators 91, the electron beam emission devices 8 and the shield 7.

Those skilled in the art can understand that the embodiments described above are exemplary, and those skilled in the art can make improvements. The structures described in the various embodiments can be combined freely without conflicts in structure or principle.

Although the present disclosure is described with reference to the drawings, the embodiments disclosed in the drawings are for illustrative purposes only and are not to be construed as limiting the present disclosure.

Although some embodiments of the general inventive concept of the present disclosure have been illustrated and described, it should be understood by those ordinary skilled in the art that these embodiments may be changed without departing from the principle and spirit of the general inventive concept of the present disclosure. The scope of the present disclosure is defined by the claims and their equivalents.

It should be noted that the word "comprising" or "including" does not exclude other elements or steps, and the word "a", "an" or "one" does not exclude a plurality. In addition, any reference signs in the claims should not be construed as limiting the scope of the present disclosure.

The invention claimed is:

1. A multi-ray-source accelerator, comprising:
   a plurality of acceleration tubes, each acceleration tube of the plurality of acceleration tubes comprising an acceleration tube body that defines at least one cavity and comprises a first end and a second end opposite to the first end in a first direction, the plurality of acceleration tubes being arranged in at least one row along a straight line or an arc in a second direction different from the first direction and being connected in series with each other such that cavities of two adjacent acceleration tubes connected in series are in fluid communication with each other; and
   a microwave unit configured to provide a microwave field to the plurality of acceleration tubes, so as to accelerate electron beams in the at least one cavity of each acceleration tube of the plurality of acceleration tubes;
   wherein the plurality of acceleration tubes are arranged to allow the microwave unit to provide the microwave field from an acceleration tube at one end of the at least one row of plurality of acceleration tubes connected in series with each other, so as to accelerate electron beams in the at least one cavity of each acceleration tube of the at least one row of plurality of acceleration tubes.

2. The multi-ray-source accelerator according to claim 1, wherein
   the plurality of acceleration tubes are arranged in a row in the second direction, each acceleration tube body defines a plurality of cavities connected in series in the first direction, and the plurality of acceleration tubes are arranged to allow the microwave unit to provide the microwave field from a cavity of an acceleration tube at one end of the row of plurality of acceleration tubes, so as to establish an acceleration field in cavities of the at least one row of plurality of acceleration tubes to accelerate electron beams emitted from the first end toward the second end in the first direction within the cavities of each acceleration tube; or
   the plurality of acceleration tubes are arranged in a plurality of rows in the second direction, each acceleration tube body defines a plurality of cavities connected in series in the first direction, and the plurality of acceleration tubes are arranged to allow the microwave unit to provide the microwave field from a cavity of an acceleration tube at one end of the plurality of rows of acceleration tubes, so as to establish an acceleration field in cavities of the at least one row of plurality of acceleration tubes to accelerate electron beams emitted from the first end toward the second end in the first direction within the cavities of each acceleration tube.

3. The multi-ray-source accelerator according to claim 1, further comprising a plurality of electron beam emission devices, each acceleration tube of the plurality of acceleration tubes being connected to a corresponding electron beam emission device among the plurality of electron beam emission devices, the corresponding electron beam emission device being disposed at the first end of each acceleration tube and configured to emit electron beams from the first end of the acceleration tube toward the second end in the first direction.

4. The multi-ray-source accelerator according to claim 1, wherein each acceleration tube of the plurality of acceleration tubes comprises a target installed at the second end of a corresponding acceleration tube, such that the electron beams emitted from the first end of the acceleration tube toward the second end in the first direction within the cavity bombard onto the target to generate rays.

5. The multi-ray-source accelerator according to claim 1, further comprising a plurality of collimators configured to collimate rays generated by the acceleration tube into a ray beam, each of the collimators being connected to a corresponding acceleration tube among the plurality of acceleration tubes, and each of the plurality of collimators being configured to have a collimation slit capable of independently adjusting its orientation so as to adjust, independently of the other acceleration tubes, the rays generated by the acceleration tube connected to the each collimator, thereby generating a desired ray beam.

6. The multi-ray-source accelerator according to claim 5, wherein the collimator is configured to be rotatable relative to the acceleration tube body so that the rays emitted by respective acceleration tubes have the same orientation and profile.

7. The multi-ray-source accelerator according to claim 6, wherein each of the collimators is rotatable relative to the acceleration tube body so that the collimation slit of the collimator extends in a vertical direction, an inclined direction, or a horizontal direction.

8. The multi-ray-source accelerator according to claim 1, further comprising a shield configured to surround the plurality of acceleration tubes, so as to shield electron beams generated by the plurality of acceleration tubes and rays generated by the plurality of acceleration tubes.

9. The multi-ray-source accelerator according to claim 8, wherein the shield has an integral structure such that the plurality of acceleration tubes are surrounded by the integral shield.

10. The multi-ray source accelerator according to claim 1, further comprising a cooling water loop, the cooling water loop being in communication with the microwave unit so as to cool the microwave unit, the cooling water loop being in communication with the acceleration tube bodies of the plurality of acceleration tubes to cool the acceleration tube bodies, targets, collimators and shield, and the cooling water loop being further in communication with electron beam emission devices so as to cool the electron beam emission devices.

11. The multi-ray-source accelerator according to claim 1, further comprising a gas supply pipeline configured to provide carrier gas to the microwave unit.

12. An inspection method using a multi-ray-source accelerator according to claim 1, the inspection method comprising:
   activating the microwave unit to provide a microwave field from an acceleration tube at one end of the row of plurality of acceleration tubes connected in series with each other;
   providing gas to a waveguide structure of the microwave unit with a gas supply pipeline;
   emitting electron beams in a first direction with an electron beam emission device, so that the electron beams are accelerated by the microwave field to bombard onto a target; and
   irradiating an article with one or more ray beam emitted by the multi-ray source accelerator;
   wherein a cooling water loop provides cooling water to cool acceleration tube bodies, targets, collimators, electron beam emission devices and shield.

13. The inspection method according to claim 12, wherein the plurality of acceleration tubes are arranged in a row in the second direction, each acceleration tube body defines a plurality of cavities connected in series in the first direction, and the activating the microwave unit to provide a microwave field comprises:
   activating the microwave unit to provide the microwave field from a cavity of an acceleration tube at one end of the row of plurality of acceleration tubes, so as to establish an acceleration field in cavities of the at least one row of plurality of acceleration tubes to accelerate electron beams emitted from the first end toward the second end in the first direction within the cavities of each acceleration tube; or
   wherein the plurality of acceleration tubes are arranged in a plurality of rows in the second direction, each acceleration tube body defines a plurality of cavities connected in series in the first direction, and the activating the microwave unit to provide a microwave field comprises:
   activating the microwave unit to provide the microwave field from a cavity of an acceleration tube at one end of the plurality of rows of acceleration tubes, so as to establish an acceleration field in cavities of the at least one row of plurality of acceleration tubes to accelerate electron beams emitted from the first end toward the second end in the first direction within the cavities of each acceleration tube.

14. The inspection method according to claim 12, wherein the multi-ray-source accelerator further comprises a plurality of electron beam emission devices, each acceleration tube of the plurality of acceleration tubes being connected to a corresponding electron beam emission device among the plurality of electron beam emission devices, the corresponding electron beam emission device being disposed at the first end of each acceleration tube; and
the emitting electron beams in a first direction with an electron beam emission device comprises:
   emitting, by the corresponding electron beam emission device, electron beams from the first end of the acceleration tube toward the second end in the first direction.

15. The inspection method according to claim 12, wherein each acceleration tube of the plurality of acceleration tubes comprises a target installed at the second end of a corresponding acceleration tube, and
the electron beams emitted from the first end of the acceleration tube toward the second end in the first direction within the cavity bombard onto the target to generate rays.

16. The inspection method according to claim 12, wherein the multi-ray-source accelerator further comprises a plurality of collimators, each of the collimators being connected to a corresponding acceleration tube among the plurality of acceleration tubes, and
the inspection method further comprises:
   collimating, by the plurality of collimators, rays generated by the acceleration tube into a ray beam; and
   independently adjusting an orientation of a collimation slit of each of the plurality of collimators so as to adjust, independently of the other acceleration tubes, the rays generated by the acceleration tube connected to the each collimator, thereby generating a desired ray beam.

17. The inspection method according to claim 16, further comprising:
   rotating the collimators relative to the acceleration tube body so that the rays emitted by respective acceleration tubes have the same orientation and profile.

18. The inspection method according to claim 17, wherein the rotating the collimators relative to the acceleration tube body comprises:
   rotating each of the collimators relative to the acceleration tube body so that the collimation slit of the collimator extends in a vertical direction, an inclined direction, or a horizontal direction.

19. The inspection method according to claim 12, further comprising:
   providing a shield to surround the plurality of acceleration tubes, so as to shield electron beams generated by the plurality of acceleration tubes and rays generated by the plurality of acceleration tubes.

20. The inspection method according to claim 12, wherein the cooling water loop is in communication with the microwave unit so as to cool the microwave unit,
the cooling water loop is in communication with the acceleration tube bodies of the plurality of acceleration tubes to cool the acceleration tube bodies, targets, collimators and shield, and
the cooling water loop is further in communication with electron beam emission devices so as to cool the electron beam emission devices.

* * * * *